June 7, 1949.  G. W. GROSSMITH  2,472,703
CAR AND WAGON TIPPLER OR DUMPER
Filed Feb. 20, 1947  8 Sheets-Sheet 1

Inventor
George Wilfred Grossmith
By Fraser, Myers & Manley
Att'ys.

June 7, 1949.  G. W. GROSSMITH  2,472,703
CAR AND WAGON TIPPLER OR DUMPER
Filed Feb. 20, 1947  8 Sheets-Sheet 2

Inventor
George Wilfred Grossmith
By Mason, Myers & Manley
Atty's.

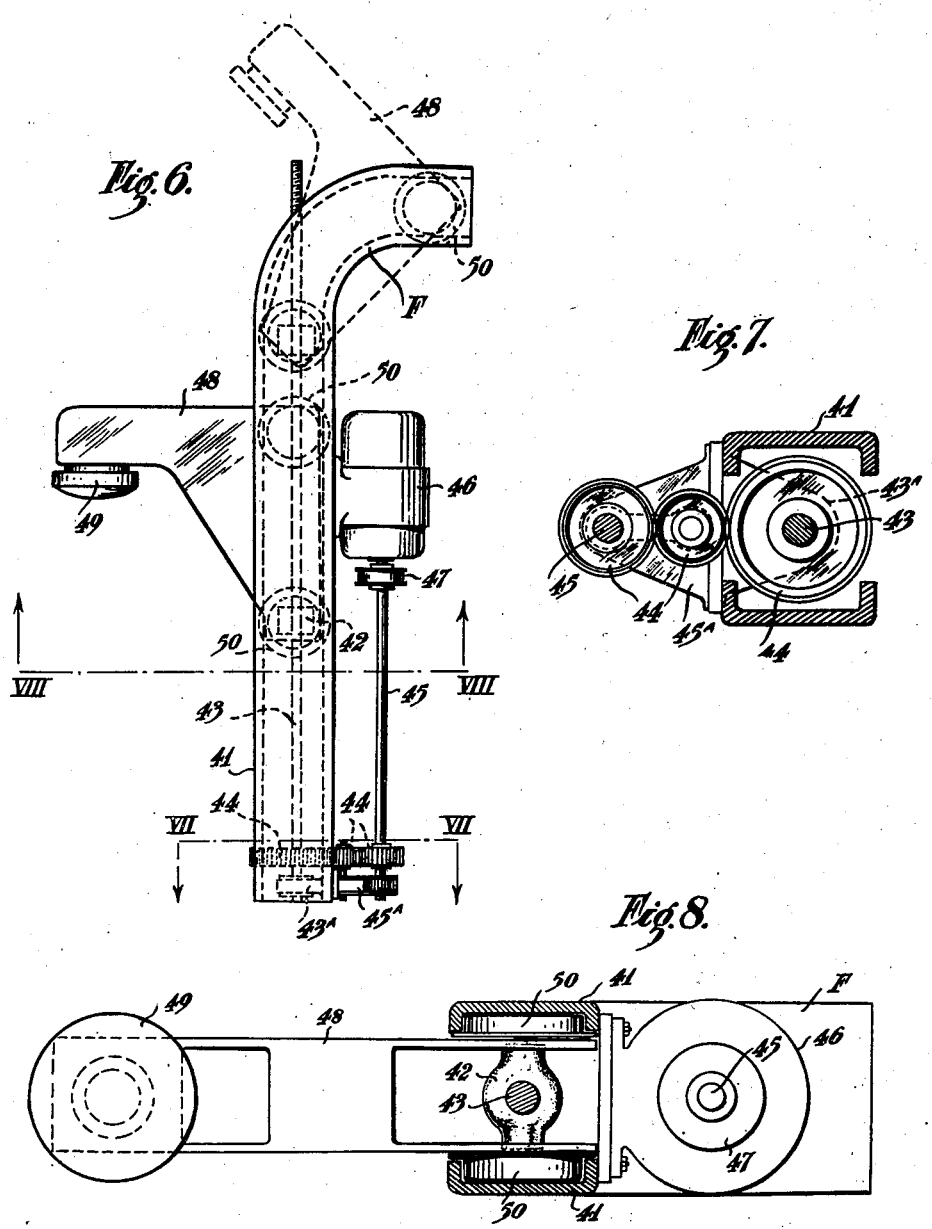

June 7, 1949.　　　　G. W. GROSSMITH　　　　2,472,703
CAR AND WAGON TIPPLER OR DUMPER
Filed Feb. 20, 1947　　　　　　　　　　　8 Sheets-Sheet 6

Inventor
George Wilfred Grossmith
By Fraser, Myers & Manley
Attys.

June 7, 1949. G. W. GROSSMITH 2,472,703
CAR AND WAGON TIPPLER OR DUMPER
Filed Feb. 20, 1947 8 Sheets-Sheet 7
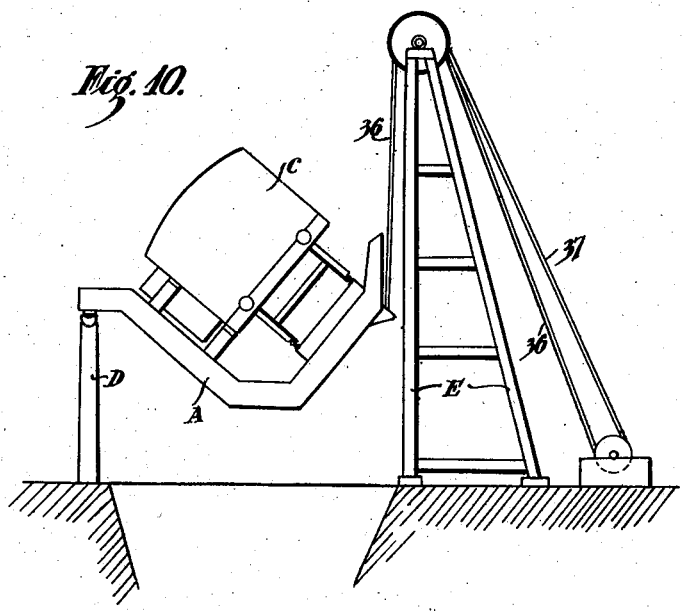
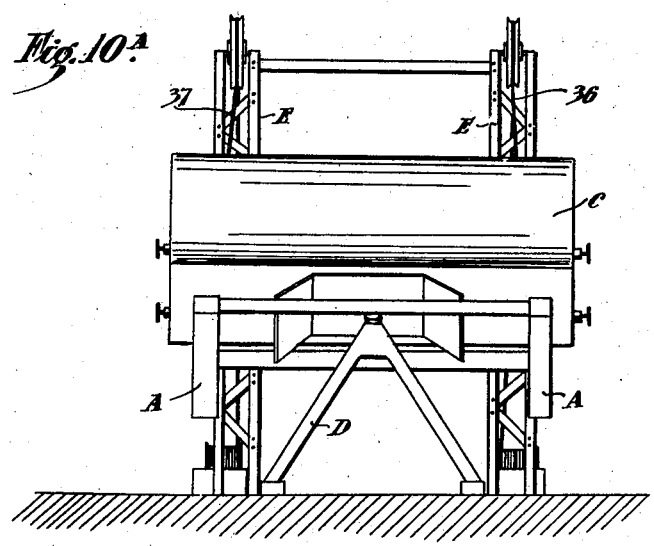
Inventor
George Wilfred Grossmith
By Fraser, Myers & Manley
Atty's.

June 7, 1949.  G. W. GROSSMITH  2,472,703
CAR AND WAGON TIPPLER OR DUMPER
Filed Feb. 20, 1947  8 Sheets-Sheet 8
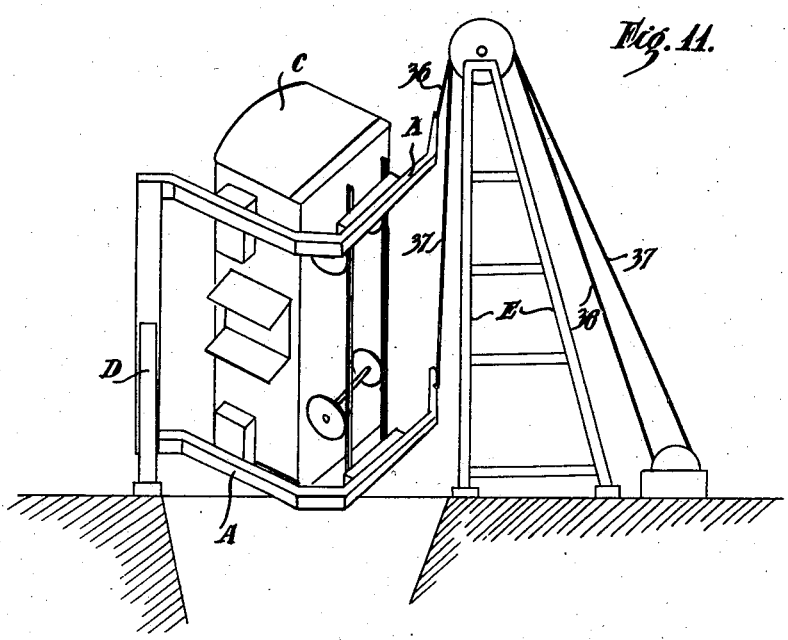
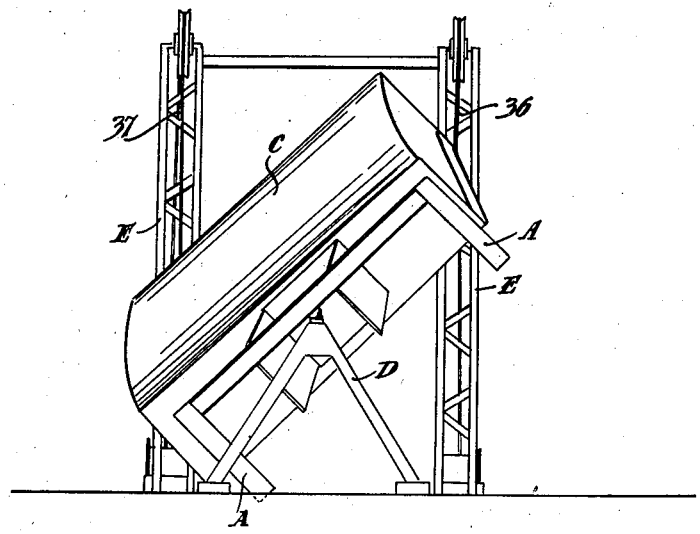
Inventor
George Wilfred Grossmith
By Fraser, Myers & Manley
Attys.

Patented June 7, 1949

2,472,703

UNITED STATES PATENT OFFICE 2,472,703

CAR AND WAGON TIPPLER OR DUMPER

George Wilfred Grossmith, Bristol, England, assignor of one-half to Strachan & Henshaw, Limited, Bristol, England, a company of Great Britain Application February 20, 1947, Serial No. 729,839
In Great Britain May 17, 1946

20 Claims. (Cl. 214—52)

This invention relates to apparatus for emptying vehicles by tilting or inverting them.

Various tippler or dumper constructions are known for tilting or inverting vehicles, and in particular railway wagons, for the purpose of emptying them by tippling out the contents. It is well recognized that apparatus for tilting a wagon is less expensive to build than apparatus for inverting the wagon, but in its known forms it is only suitable for discharging certain kinds of materials, namely those which will flow readily such as grin. Even then difficulty arises in the case of wagons provided with side doors in completely emptying the wagon through the side doors without the necessity of hand trimming. This is of particular importance in the case of box wagons which cannot of course be emptied by inversion. The typical covered box type wagon has narrow doors in the centre of the sides, these doors being only about one quarter or one fifth of the length of the wagon. To empty the wagon by hand labour therefore involves the trimming of most of the material lengthwise of the wagon towards the centre, where it can be thrown out of the open doorway.

Another difficulty is that owing to the construction of some oil lubricated axle boxes the wagons must not be inverted because of the danger of loss of oil, and in many cases inversion cannot be used because damage to the goods being handled might result.

The object of the present invention is to provide apparatus enabling various types of vehicles and loads to be emptied without hand-trimming. For convenience the term "wagon" is used herein to include all forms of railroad goods trucks as well as other vehicles which are suitable for emptying by such appartus.

A more specific object of the invention is to provide apparatus for emptying, without hand-trimming, such types of wagon which cannot, for one of the above reasons or for other reasons, be emptied by inversion. Nevertheless, the apparatus can be constructed for inversion of those kinds of wagon which can be so emptied, e. g. open-topped wagons, and in which this entails no danger to the wagon or its contents.

Another object of the invention is to enable both granular material and others which are lumpy and not so freely flowing to be discharged from their wagons by tilting without inverstion thereof and with a minimum of hand-trimming.

A further object of the invention is to provide a wagon tippler which is simple and cheap to construct and easy to operate.

A still further object is to provide improved and efficacious means for preventing movement of the wagon while being tilted on the tippler, and particularly buffer mules engageable with the ends of the wagon for preventing longitudinal movement thereof.

Other objects and advantages of the invention will be apparent from the following description, given by way of example, of one form of apparatus made in accordance with the present invention, reference being made to the accompanying drawings, wherein:

Fig. 6 is a detailed view of one of the buffer mule units in plan;

Figs. 7 and 8 are sectional elevations on an enlarged scale on the lines VII—VII and VIII—VIII respectively of Fig. 6;

Figs. 10 and 11 are diagrammatic end views showing the apparatus in different phases of its operation;

Figure 1:
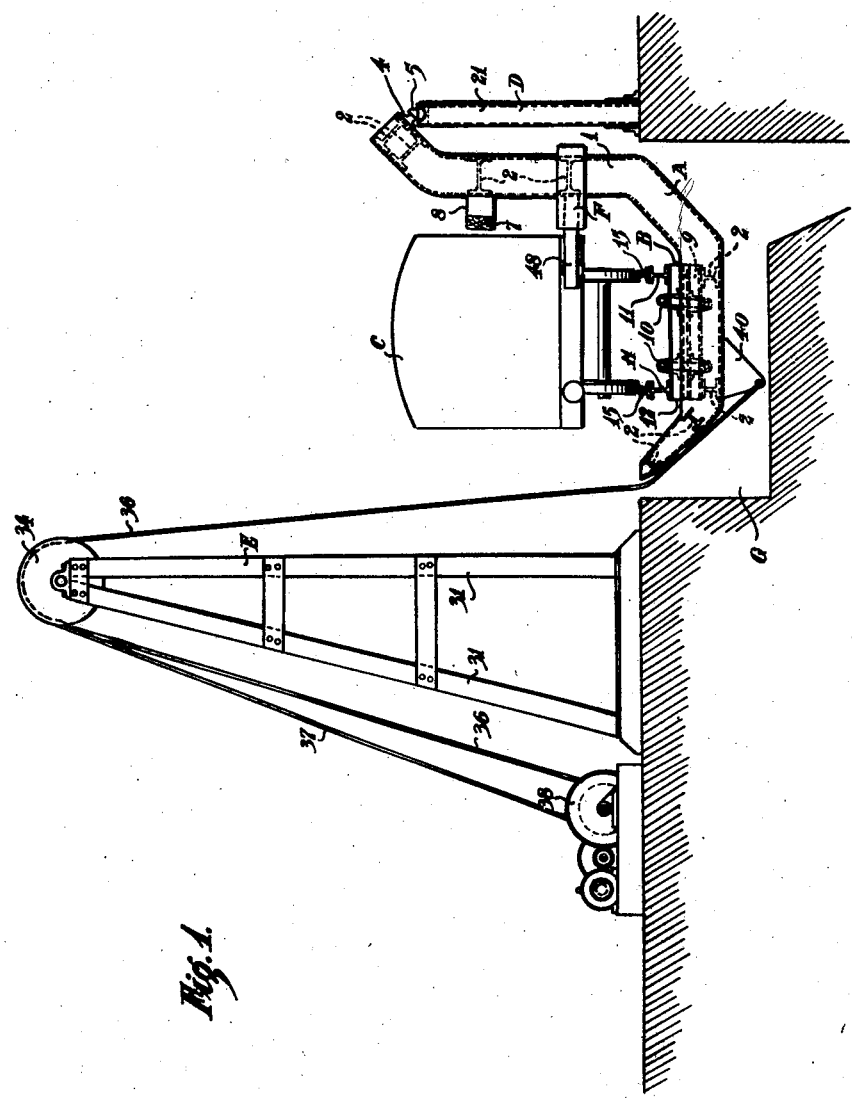
Fig. 1 is an end view of a wagon tippler, showing a wagon in position ready for the tilting operation.

Figs. 10A and 11A being corresponding diagrammatic side views.

The main parts of the apparatus are a platform comprising a cradle A and a rail table B together by link mechanism and providing a base for a wagon C, a supporting structure D to which the cradle A is universally jointed, winch mechanism E for operating two ropes or cables attached to the underside of the cradle A and buffer mule mechanism F attached to the cradle A. The whole apparatus is mounted over a pit G beneath which hoppers or other means for receiving the material discharged from the wagon may be positioned.

The cradle A consists of end members 1, a number of longitudinal members 2 and bracing members 3. The longitudinal members 2 at the top of the cradle are provided with a central bracket 4 carrying the ball part of a universal joint 5 of the ball-and-socket type.

Two pairs of wagon side supports 7 are provided, made of felt-covered wood or other suitable material, the lower pair being mounted on the two buffer mule units and the upper pair being connected to brackets 8 mounted on another of the longitudinal members 2. Connected across the lower longitudinal members 2 at either end thereof is a transverse H-section member 9. A bearing bracket is secured on the top flange near either end of each of these members 9 to provide bearings for the pivots of pair of links 10, one link 10 depending from the pivot at each side of each bracket, there being thus four such link pairs in all.

The rail table B consists of longitudinal members 11 and transverse members 12 and 13. The transverse members 12, of which there are four, two on either side of each of the members 9 and somewhat above the latter, are of channel-section and each has a downwardly projecting bearing bracket secured to its lower flange for pivotal connection of the depending ends of the links 10. The table B is thus suspended from the cradle A and it will be seen from Figs. 1 and 4 that this arrangement enables the links to turn about their upper or cradle pivots in the direction of the arrows (Fig. 4) when the cradle is tilted, correspondingly permitting of a small controlled parallel lateral displacement of the rail table B. Mounted on top of the longitudinal members 11 and rails 15 for the wagon C and the arrangement is such that, when the cradle is in its lowest position with the free edges of the members 11 of the rail table B resting on a stepped abutment face in the pit G (Fig. 3), the rails 15 are in alignment and level with the approach rails 16 of the railroad track, whilst the links 10 are slightly out of the perpendicular as shown in Fig. 1.

Figure 2:
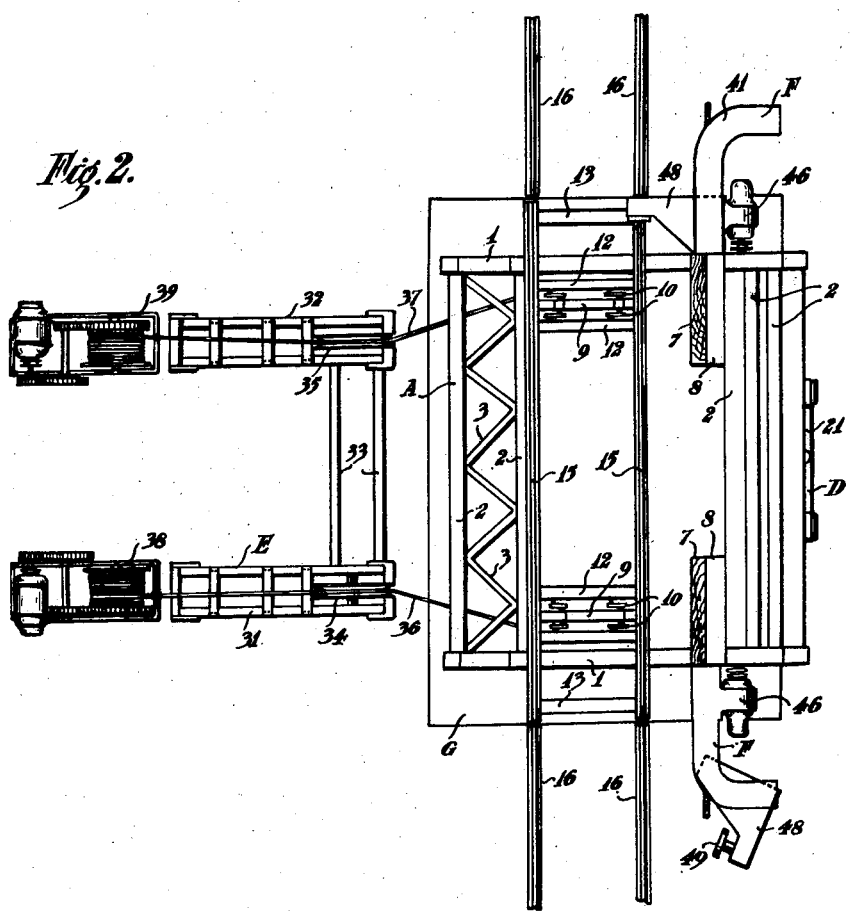
Fig. 2 is a plan of the apparatus shown in Fig. 1, but with the wagon omitted for clarity and one of the buffer mules in open position.
Figure 3:
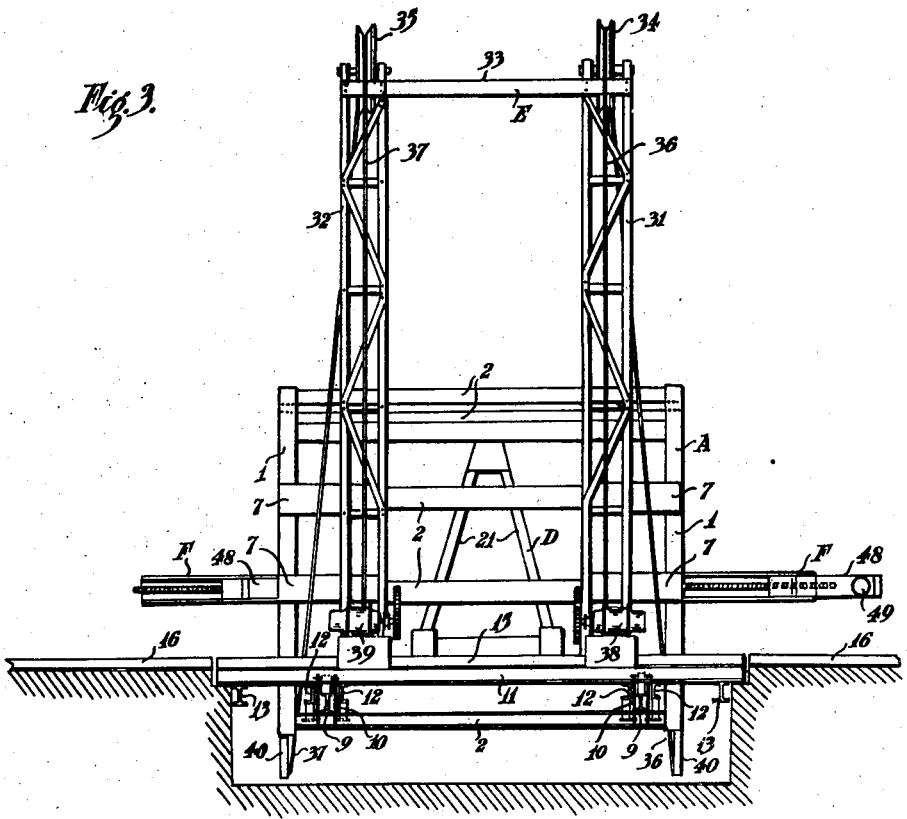
Fig. 3 is a side elevation of the same arrangement as shown in Fig. 2.
Figure 4:
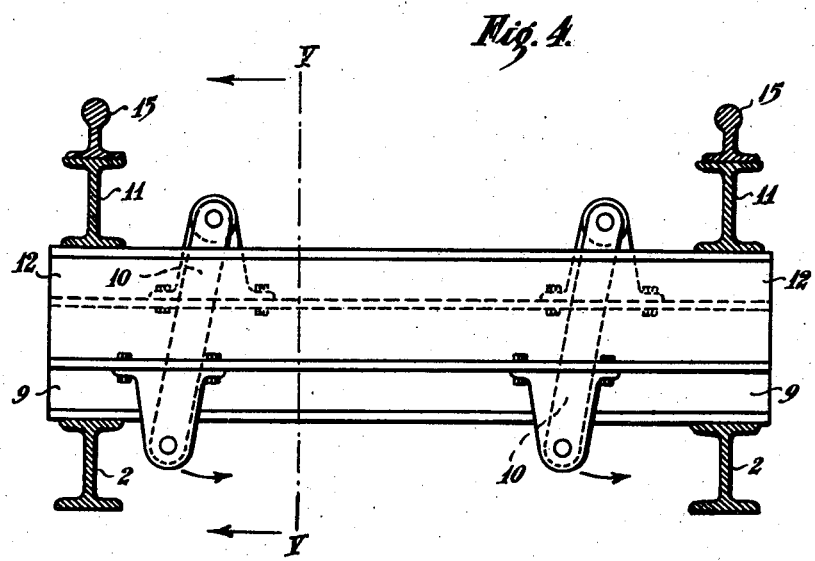
Figs. 4 and 5 are fragmentary part sectional views, respectively corresponding to Figs. 1 and 3, of a detail of construction, Fig. 5 being a section on the lines V—V of Fig. 4.
Figure 5:
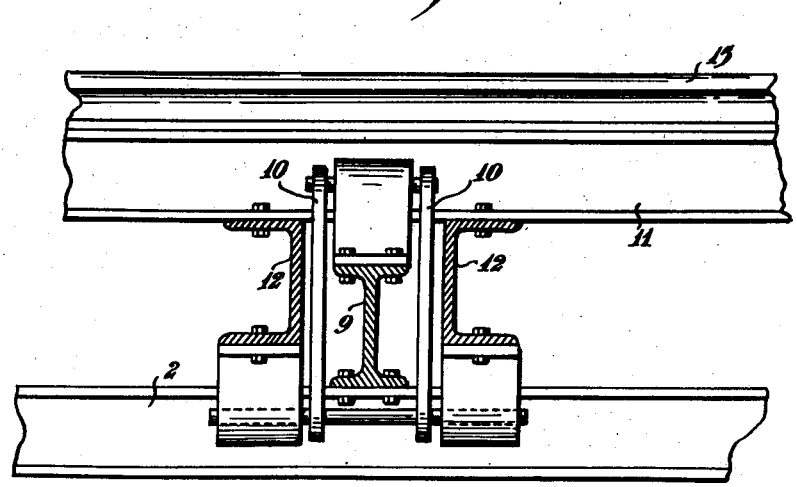
Figure 9:
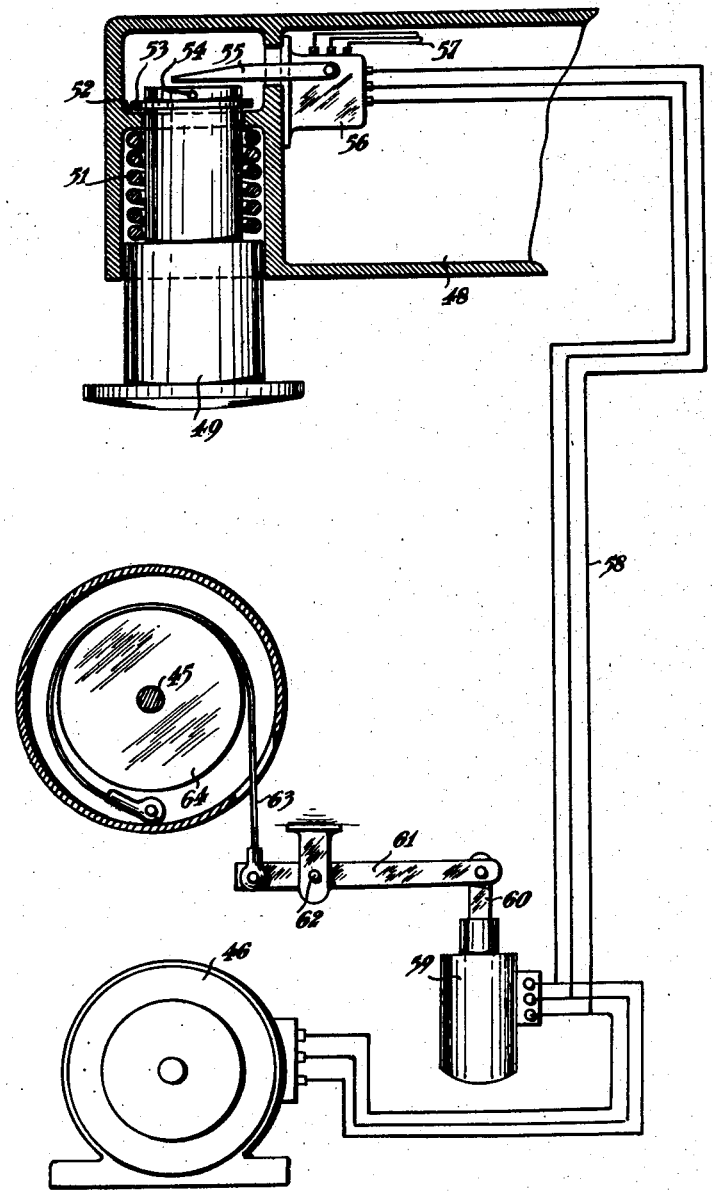
Fig. 9 is a partly diagrammatical representation of the automatic cut-out and brake system for the buffer mules.

The wagon C, which is not shown in Figs. 2 and 3, is of the closed-top box type with narrow doors in the centre of the sides, and is assumed in this example to be filled with granular material, e. g. sand. The clearance between the side of the wagon and the parts of the longitudinal members 2 intermediate of the side supports 7 is such as to allow the wagon doors in the centre of the side of the wagon to be opened.

The cradle support D consists of a braced structure 21 the members of which are joined at the top to form a support for the bearings of the socket part of the universal joint 5.

The winch mechanism E consists of two braced and strutted structures 31 and 32 connected together by cross members 33. Each of the structures 31 and 32 is provided at the top with a bearing for pulleys 34 and 35 respectively over which pass cables 36 and 37 respectively from winches 38 and 39. Each of the winches has its own motor and associated gearings so that the two winches can be driven independently of one another. The cables 36 and 37 are attached to brackets 40 on the underside of the cradle A.

The buffer mule mechanism F consists of two units, one at each end of the cradle, and each unit is secured along one of the longitudinal members 2. These units are substantially similar and will be described with particular reference to Figs. 6-9 which show one unit of the mechanism. Its main part is a guide member 41 by which it is attached to the members 2 of the frame of the cradle A. The guide member 41, which is curved away from the track 16 as shown in Fig. 2, serves to guide and secure against rotation a traversing nut 42 mounted therein upon a screw-threaded shaft 43. The latter is supported in bearings provided at either end of the guide member 41 and is driven through three spur gear wheels 44 and a shaft 45 by a motor 46 mounted on the outside of the guide member 41. The shaft 45 and the middle one of the spur gears 44 are supported in bearings provided in a bracket 45a on a plate secured to the guide member 41, the other side of which plate carries a bearing bracket 43a for the shaft 43. The shaft 45 is associated with an automatic brake 47. Pivotally connected to the traversing nut 42 is a buffer mule 48 the operative end of which is fitted with a spring-actuated plunger 49 adapted to register with one of the buffers of the wagon. The buffer mule 48 has rotatably mounted thereon four flanged wheels 50, two on its top and two on its bottom cheek plate. The guide member 41 consists of two channel-section members (Figs. 7 and 8) within which the wheels 50 engage, the pair which is co-axial with the pivot of the mule 48 (Fig. 8) thus preventing rotation of the nut 42 on the shaft 43, whilst the other pair guides the mule in the manner hereinafter described. When the motor is driven it causes the traversing nut 42 to move the buffer mule 48 forward and backward so that, between the two mule units, good contact of the plungers 49 with the buffers of a wagon of any standard length and, if desired, compression of the buffers to any given pressure is ensured. When the buffer mule 48 is traversed outwardly to its full extent, it is first retracted from the wagon buffer and the wheels 50, following the curvature of the end of the guide member 41, then cause the buffer mule to be turned about its point of pivotal connection to the nut 42 and thus swung completely clear of the wagon. It is shown in that position in dotted lines in Fig. 6. In Figs. 2 and 3, one of the buffer mules 48 is shown in the closed position corresponding to that in which it would be if the wagon C were in position on the rail table B, and the spring plunger 49 compressed, whilst the other buffer mule 48 is shown in the open or fully retracted position. It will be seen from Fig. 2 that each buffer mule unit has its own driving motor and associated gearing.

Provision is made for cutting out the motor 46 automatically on the wagon buffers being satisfactorily engaged by the buffer mules 48 and for simultaneously bringing the automatic brakes 47 into operation when the motor is cut out so as to counter-act any possibility of the buffer mules being dislodged by the springs of the wagon buffers or, more important, by the weight of the wagon during tilting. The means for achieving this are diagrammatically shown in Fig. 9. The plunger 49 of the buffer mule is pressed outwardly by a spring 51 seated on an abutment 52 which also serves to limit the outward movement of the plunger 49 by means of a washer 53 and a split-pin 54. Inward movement of the plunger 49 to a predetermined extent and, hence, predetermined compression of the spring 51 causes the plunger base to strike a trip lever 55 which operates a contact-breaker in a switch casing 56. This breaks the power supply to the motor 46 which comes from the mains through a main manual switch (not shown) and the leads 57. The circuit 58 to the motor 46 has a shunt taken off it and connected to a solenoid 59. The solenoid plunger 60 is drawn into the solenoid while the latter is energised and, through a lever 61 pivoted at 62 on a fixed bracket, keeps the brake band 63 slack on the brake drum 64 which is non-rotatably secured to the shaft 45. De-energisation of the solenoid 59, which occurs when the motor is cut-out by the contact breaker 56 or by the manual switch, results in the plunger 60 being urged outwardly by a strong internal spring, thus turning the lever 61 about its pivot 62 and applying the brake band 63 to the drum 64. In order to enable the buffer mule to be disengaged from the buffers, the manual switch (not shown) in addition to its "off" and "close buffer mules" position, has a third, "open buffer mules," position which causes the circuit breaker 56 to be short circuited, thus re-applying the mains supply to the circuit 58, whereby the brake 47 is automatically disengaged, and the motor 46 enabled to run in reverse.

To unload the wagon, it is first run on to the rail table B and secured against end movement by both buffer mules being closed. This is the position shown in Fig. 1. The wagon doors on the side facing the cradle support D are then opened in the normal manner, and it will be seen that clearance is provided between the side of the wagon on the one hand and the upright portion of the cradle A and the side supports 7 on the other hand to afford access to the doors and enables them to be opened. The granular contents of the wagon will be partially discharged.

As can be seen from Figs. 1 and 2, the two cables 36 and 37 are wound in opposite senses on their respective winch drums. They are then hauled in by the winches 38 and 39 being driven in opposite directions but at the same speed, so that the cables move in the same direction and at the same rate until the free end of the cradle A has been lifted to such an extent that the points of attachment of the cables 36 and 37 thereto are in substantially the same horizontal plane as the universal joint 5. The wagon is thereby tilted laterally and gravity causes the links 10 to displace the rail table B relative to the cradle A in the direction of the arrows (Fig. 4) until the side of the wagon rests on the side supports 7. This position of the apparatus and the wagon is diagrammatically shown in Figs. 10 and 10A and results in the discharge of more of the contents.

The two winches 38 and 39 are now worked together in the same direction causing the cable 37 to be payed out at substantially the same speed as the cable 36 is wound in, thus tilting the cradle A with its wagon longitudinally in a plane at right angles to that of the lateral tilting motion, so that the wagon has now imparted to it an endwise tilt in addition to the cross-wise tilt, and this endwise tilt is continued through an angle of up to about 60°, further rotation being usually of no value. During this motion all the contents from one end of the wagon will have run out through the open side door. This position, in which the apparatus now is, is diagrammatically shown in Figs. 11 and 11A. By arranging that, before the endwise tilting begins, the position of the apparatus is such that the three points of support of the cradle A are in the same horizontal plane, the wagon will be tilted endwise without being slewed, because when the endwise tilting begins from this position there is no turning moment about the vertical axis of the universal joint. A further safeguard against slewing can be provided by positively coupling the two winches or their motors together during this phase, which is made possible by the cables being wound on their drums in opposite senses.

To complete the emptying of the wagon, both winches 38 and 39 are then reversed in direction so that, the cable 37 is wound in and the cable 36 payed out, the winches or their motors remaining coupled if desired. This causes the cradle A and the wagon to return from the endwise tilt in one direction to a corresponding endwise tilt in the opposite direction, making a total rotation in the endwise plane of up to about 120°. During this motion all the remaining contents of the wagon will have run out through the open side door. The position which the apparatus and the wagon have now reached is not separately shown in the drawings but corresponds to that shown in Figs. 11 and 11A, with the wagon imagined to be in such a position that the ends of the wagon and the cradle which are shown in the drawing as tilted upwardly are actually tilted downwardly, and vice verse.

The wagon being thus completely emptied, the two winches 38 and 39, still running in equal senses are again reversed and the cradle A brought back to the central position with no endwise tilt, as shown in Figs. 10 and 10A. The final phase consists in driving the two winches in opposite senses so that they are both paying out cable, thus causing the cradle A to be lowered until the free edges of the rail table B rest again on the stepped abutment face of the pit G. Gravity will previously have caused the links 10 to return to the vertical position, so disengaging the side of the wagon from the side supports 7, and abutment of the rail table B in the pit brings the links 10 back to the position shown in Figs. 1 and 4, so that the rails 15 on the rail table B are again level and in alignment with the approach rails 16. The unloading operation having thus been completed, the buffer mules are swung clear of the wagon and the empty wagon is then run off the rail table and can be replaced by another full wagon and the sequence of operations repeated.

The construction above described provides simple mechanical means for imparting to the wagon first a lateral rotation to a substantial angle, followed by an oscillation, also through a substantial angle, in a plane at right angles to the first rotation, thus inclining all the inner surfaces of the wagon at such angles and combination of angles that a free flowing granular material is able to run out of the side doorway of the wagon, under the action of gravity, until the wagon is empty.

The angle of rotation in the lateral plane, which may be as much as one right angle if desired, is such that when rotation in the endwise plane takes place, no material flows across the doorway to become lodged in the opposite end of the wagon, such as would be the case if the primary rotation in the crosswise plane were only slight. The wagon is therefore completely emptied in three motions, viz. (1) rotation in the crosswise plane, (2) rotation in the endwise plane and (3) counter-rotation in the endwise plane. The wagon is now empty and the cycle of movements is completed by (4) rotation in the endwise plane until the wagon length is parallel with the track and (5) counter-rotation in the crosswise plane until the cradle is resting in its bottom position.

The construction above described enables the complete unloading, through their side doors, of closed box type or open-topped wagons, to be effected without the use of top clamping beams, and at the same time avoids that degree of rotation of wagons which with certain types of oil-lubricated axle boxes would result in the loss of some oil by leakage.

The invention is particularly useful when it is desired to unload quickly and effectively from such wagons lumpy materials such as coal, coke, limestone or metallic ores, as opposed to freely flowing material such as sand or grain or other granular materials, because no or little hand-trimming will be necessary even with such lumpy materials.

It will be obvious that the construction above described may be modified in many ways without departing from the scope of the invention. For example, the two units of the buffer mule mechanism may be driven by a single motor through suitable gearing or, alternatively, they may be hand-operated, such as by a hand-wheel. The winches may also have a single power unit driving them through clutches or shifting gears, in such a way that the two winches may be driven in the same or opposite directions at will and in the desired sequence in order to impart to the two cradle operating cables the same essential motions as described for separate driving units. The rail table, instead of being connected to the cradle through the link mechanism permitting a controlled parallel lateral movement of the cradle, may be pivotally mounted along one side of the cradle to allow a slight tilting movement of the table about a longitudinal axis so that when the cradle begins to tilt laterally the wagon under the influence of gravity comes to rest against the side supports. Alternatively, the table may remain stationery or be integral or even identical with the cradle, means being provided to make the side supports movable into contact with the side of the wagon. The universal joint connecting the cradle to the cradle support structure may be of the type with two pivots at right angles instead of the ball and socket type as described. The cradle may be provided with a chute attached thereto and located beneath the door opening of the wagon, so that material is discharged from the wagon into the chute whence it is directed into a hopper or other suitable means. A further modification is the possible incorporation with the rail table of a weighbridge. Means may also be provided for use with open-topped wagons without side doors which will enable the wagon to be completely inverted, if desired, in which case retaining mechanism would be associated with the cradle to engage the wagon and hold it on the rail table when in the inverted position. The term "tilting" as hereinafter used therefore includes tilting to an extent amounting to complete inversion.

It will also be seen that the invention, while particularly intended for wagons, trucks or similar rail-road rolling stock, could be applied without much difficulty to apparatus for emptying other vehicles, and the term "wagon" as hereinafter used covers any vehicle which can be emptied by apparatus made in accordance with the invention.

I claim:

1. Wagon tilting apparatus comprising a frame for receiving a wagon, a rigid support, universal means connecting said frame, toward one peripheral portion thereof, to said support, and means for supporting said frame at substantially spaced-apart points toward peripheral portions of the frame opposite to said one peripheral portion, the said supporting means being operable to raise the frame at either of said points relatively to the other of said points.

2. Wagon tilting apparatus comprising in combination a platform for receiving the wagon, fixed supporting means for supporting said platform at one point thereof, a universal joint connecting said fixed supporting means with said platform at said point thereof, movable supporting means for supporting said platform at two further points thereof spaced from each other and from said first point, operating means for said movable supporting means for raising and lowering said two further points independently of each other to tilt said platform laterally and longitudinally about said universal joint, and joint means at said two further points to permit relative angular movement between said movable supporting means and said platform during said tilting thereof.

3. Wagon tilting apparatus comprising in combination a platform for receiving the wagon, fixed supporting means for supporting said platform at a point situated along one side thereof, a universal joint at said point for connecting said fixed supporting means with said platform, second supporting means for supporting said platform at two spaced points situated along the opposite side thereof, operating means for moving said second supporting means to tilt said platform laterally and longitudinally about said universal joint, and joint means at said two spaced points to permit relative angular movement between said second supporting means and said platform during tilting thereof, said joint means in the untilted position of said platform being in a horizontal plane below that of said universal joint and being adapted, by lateral tilting of said platform and before longitudinal tilting thereof commences, to be brought into the same horizontal plane as that of said universal joint.

4. Wagon tilting apparatus comprising in combination a platform for receiving the wagon, first and second fixed supports for said platform, a universal joint connecting said first fixed support with said platform at one point thereof, and suspension means pivotally attached to said platform at two further points thereof spaced from each other and from said first point for suspending said platform from said second fixed support and operable to tilt said platform laterally and longitudinally about said universal joint.

5. Wagon tilting apparatus comprising in combination a platform for receiving the wagon, a fixed support for said platform, a universal joint connecting said fixed support with said platform at a point situated at one side of said platform, two suspension cables each attached to said platform at a different one of two spaced points situated at the opposite side thereof, a winch for actuating each of said suspension cables, and means for operating said winches to move said suspension cables in the same direction for laterally tilting said platform and in opposite directions for longitudinally tilting said platform.

6. Wagon tilting apparatus comprising in combination a tiltable platform for receiving the wagon, a fixed support for said platform, a universal joint connecting said fixed support with said platform at a point situated at one side of said platform, two suspension cables attached to said platform and operable to tilt said platform laterally and longitudinally about said universal joint, a winch associated with each of said suspension cables for operating same, said suspension cables being wound on said winches in mutually opposite senses and being attached to said platform at spaced points situated at the opposite side of said platform and, in the untilted position of said platform, in a horizontal plane below that of said universal joint, and driving means for first operating said two winches simultaneously in mutually opposite directions to elevate said spaced points substantially to the horizontal plane of the universal joint and thereby tilt said platform laterally and for subsequently operating said two winches in similar directions to tilt said platform longitudinally.

7. Wagon tilting apparatus comprising in combination a platform for receiving the wagon, fixed supporting means for supporting said platform at one point thereof, a universal joint connecting said fixed supporting means with said platform at said point thereof, movable supporting means for supporting said platform at two further points thereof spaced from each other and from said first point, operating means for said movable supporting means for raising and lowering said two further points independently of each other to tilt said platform laterally and longitudinally about said universal joint, joint means at said two further points to permit relative angular movement between said movable supporting means and said platform during said tilting thereof, means associated with said platform and co-operable with the wagon for limiting lateral displacement thereof relative to said platform, and buffer mule means associated with said platform and engageable with both ends of the wagon for preventing longitudinal displacement thereof relative to said platform and movable out of engagement with the wagon ends and clear of the path of the wagon to and from said platform.

8. Wagon tilting apparatus comprising a frame for receiving a wagon, a rigid support, universal means toward one peripheral portion of the frame for universally connecting the frame to said support, and spaced-apart, raising-lowering means coacting with the frame at different points toward an opposite peripheral portion thereof, the said raising-lowering means being similarly operable to raise the frame at both said points in unison relatively to said rigid support to tilt the frame about one axis, and being oppositely operable to raise the frame at either of said points while lowering it at the other of said points, to tilt it about another axis.

9. Wagon tilting apparatus comprising in combination a platform for receiving the wagon, fixed supporting means for supporting said platform at one point thereof, a universal joint connecting said fixed supporting means with said platform at said point thereof, movable supporting means for supporting said platform at two further points thereof spaced from each other and from said first point, operating means for said movable supporting means for raising and lowering said two further points independently of each other to tilt said platform laterally and longitudinally about said universal joint, joint means at said two further points to permit relative angular movement between said movable supporting means and said platform during said tilting thereof, means associated with said platform and co-operable with the wagon for limiting lateral displacement thereof relative to said platform, buffer mules associated with both ends of said platform and engageable with the ends of the wagon so as to restrain it against longitudinal displacement relative to said platform, driving means for said buffer mules adapted to cause movement of said buffer mules into and out of engagement with the wagon ends, and guide means co-operating with each of said buffer mules for causing said movements of said buffer mules to be both longitudinally and laterally of said platform, whereby said buffer mules, upon disengagement from the wagon ends, are adapted to be moved laterally clear of the path of the wagon to and from said platform.

10. Wagon tilting apparatus comprising in combination a tiltable platform for receiving the wagon, a fixed support for said platform, a universal joint connecting said fixed support with said platform at a point situated at one side of said platform, two suspension cables each attached to said platform at a different one of two spaced points situated at the opposite side thereof, a winch for actuating each of said suspension cables, driving means for independently operating said winches to move said suspension cables in the same direction for laterally tilting said platform and in opposite directions for longitudinally tilting said platform, buffer mules associated with both ends of said platform and engageable with the ends of the wagon so as to restrain it from longitudinal displacement relative to said platform during tilting thereof, driving means for said buffer mules adapted to cause movements of said buffer mules into and out of engagement with the wagon ends, and guide means cooperating with each of said buffer mules for causing said movements of said buffer mules to be both longitudinally and laterally of said platform, whereby said buffer mules, upon disengagement from the wagon ends, are adapted to be moved laterally clear of the path of the wagon to and from said platform.

11. Wagon tilting apparatus comprising in combination a platform for receiving the wagon, a fixed support for said platform, a universal joint connecting said fixed support with said platform at a point situated along one side of said platform, two suspension cables attached to said platform and operable to tilt said platform laterally and longitudinally about said universal joint, a winch associated with each of said suspension cables for operating same, said suspension cables being wound on said winches in mutually opposite senses and being attached to said platform at spaced points situated along the opposite side of said platform and, in the untilted position of said platform, in a horizontal plane below that of said universal joint, driving means for first rotating said two winches simultaneously in mutually opposite directions to tilt said platform laterally and bring said spaced points level with said universal joint, and for subsequently rotating said two winches in equal directions to tilt said platform longitudinally, buffer mules associated with both ends of said platform and engageable with the ends of the wagon so as to restrain it from longitudinal displacement relative to said platform during tilting thereof, driving means for said buffer mules adapted to cause movements of said buffer mules into and out of engagement with the wagon ends, and guide means cooperating with each of said buffer mules for causing said movements of said buffer mules to be both longitudinally and laterally of said platform, whereby said buffer mules, upon disengagement from the wagon ends, are adapted to be moved laterally clear of the path of the wagon.

12. Wagon tilting apparatus comprising in combination a platform for receiving the wagon, fixed supporting means for said platform, a joint connecting said fixed supporting means with said platform at one point of said platform and permitting movement thereof in at least two planes, movable supporting means for said platform coacting therewith at two further points thereof spaced from each other and said first point, means for operating said movable supporting means to tilt said platform laterally and longitudinally about said joint, means co-operable with the wagon for preventing lateral displacement thereof relative to said platform, a guide member at each end of said platform connected thereto and extending along one side thereof, each of said guide members having a straight part extending longitudinally of said platform and an integral curved part adjacent the associated end of said platform and extending laterally away from said platform, a screw-threaded shaft rotatably mounted in each of said guide members, power-operated driving means for rotating said shafts, a traversing nut mounted on each of said shafts and co-operating with said guide members so as to be longitudinally movable on said shafts but non-rotatable therewith, a buffer mule connected to each of said traversing nuts for pivotal movement relative thereto in a substantially horizontal plane, said buffer mules being engageable with the ends of the wagon to prevent longitudinal displacement of the wagon relative to said platform, and guide member co-operating means associated with each of said buffer mules, whereby, upon rotation of said shafts in one direction, said buffer mules are caused to be disengaged from the wagon ends and moved longitudinally of said platform while said guide member co-operating means are co-operating with said straight parts, and moved laterally away from said platform and clear of the path of the wagon when said guide member co-operating means co-operate with said curved parts.

13. Wagon tilting apparatus comprising in combination a platform for receiving the wagon, a fixed support for said platform, a universal joint connecting said fixed support with said platform at a point situated along one side of said platform, two suspension cables each attached to said platform at one of two spaced points situated along the opposite side thereof, a winch for each of said suspension cables, driving means for independently operating said winches to move said suspension cables in the same direction for lateral tilt of said platform and in opposite directions for longitudinal tilt of said platform, a guide member at each end of said platform connected thereto and extending along one side thereof, each of said guide members having a straight part extending longitudinally of said platform and an internal curved part adjacent the associated end of said platform and extending laterally away from said platform, a screw-threaded shaft rotatably mounted in each of said guide members, power-operated driving means for rotating said shafts, a traversing nut mounted on each of said shafts and co-operating with said guide members so as to be longitudinally movable on said shafts but non-rotatable therewith, a buffer mule connected to each of said traversing nuts for pivotal movement relative thereto in a substantially horizontal plane, said buffer mules being engageable with the ends of the wagon to prevent longitudinal displacement of the wagon relative to said platform, and guide member co-operative means associated with each of said buffer mules, whereby upon rotation of said shafts in one direction, said buffer mules are caused to be disengaged from the wagon ends and moved longitudinally of said platform while said guide member co-operating means are co-operating with said straight parts, and moved laterally away from said platform and clear of the path of the wagon when said guide member co-operating means co-operate with said curved parts.

14. Wagon tilting apparatus comprising in combination a platform for receiving the wagon, fixed supporting means for said platform, a joint connecting said fixed supporting means with said platform at one point of said platform and permitting movement thereof in at least two planes, movable supporting means for said platform co-acting therewith at two further points thereof spaced from each other and from said first point, means for operating said movable supporting means to tilt said platform laterally and longitudinally about said joint, means co-operable with the wagon for preventing lateral displacement thereof relative to said platform, buffer mules associated with both ends of said platform, an electric motor for said buffer mules, an electric circuit for said motor, means for connecting said motor in said circuit so as to cause movement of said buffer mules in one direction into engagement with the ends of the wagon to restrain the wagon from longitudinal displacement relative to said platform, an electrically operable brake operatively associated with said motor, automatic means for disconnecting said motor from said circuit and applying said brake to prevent the wagon from moving said buffer mules when said buffer mules have attained a predetermined position of engagement with the wagon ends, means for rendering said brake ineffective and re-connecting said motor in said circuit so as to cause movement of said buffer mules in the reverse direction out of engagement with the wagon ends, and means for directing said movements of said buffer mules respectively into and clear of the path of the wagon.

15. Wagon tilting apparatus comprising in combination a platform for receiving the wagon, a fixed support for said platform, a universal joint connecting said fixed support with said platform at a point situated along one side of said platform, two suspension cables each attached to said platform at one of two spaced points situated along the opposite side thereof, a winch for each of said suspension cables, driving means for independently operating said winches to move said suspension cables in the same direction for lateral tilt of said platform and in opposite directions for longitudinal tilt of said platform, buffer mules associated with both ends of said platform, an electric motor for said buffer mules, an electric circuit for said motor, means for connecting said motor in said circuit so as to cause movement of said buffer mules in one direction into engagement with the ends of the wagon to restrain the wagon from longitudinal displacement relative to said platform, an electrically operable brake operatively associated with said motor, automatic means for disconnecting said motor from said circuit and applying said brake to prevent the wagon from moving said buffer mules when said buffer mules have attained a predetermined position of engagement with the wagon ends, means for rendering said brake ineffective and re-connecting said motor in said circuit so as to cause movement of said buffer mules in the reverse direction out of engagement with the wagon ends, and means for directing said movements of said buffer mules respectively into and clear of the path of the wagon.

16. Wagon tilting apparatus comprising in combination a platform for receiving the wagon, fixed supporting means for said platform, a joint connecting said fixed supporting means with said platform at one point of said platform and permitting movement thereof in at least two planes, movable supporting means for said platform coacting therewith at two further points thereof spaced from each other and from said first point, means for operating said movable supporting means to tilt said platform laterally and longitudinally about said joint, means co-operable with the wagon for preventing lateral displacement thereof relative to said platform, a guide member at each end of said platform connected thereto and extending along one side thereof, each of said guide members having a straight part extending longitudinally of said platform and an integral curved part adjacent the associated end of said platform and extending laterally away from said platform, a screw-threaded shaft rotatably mounted in each of said guide members, a traversing nut mounted on each of said shafts and co-operating with said guide members so as to be longitudinally movable on said shafts but non-rotatable therewith, a buffer mule connected to each of said traversing nuts for pivotal movement relative thereto in a substantially horizontal plane, said buffer mules being engageable with the ends of the wagon to prevent longitudinal displacement of the wagon relative to said platform, guide member co-operating means associated with each of said buffer mules, an electric motor for driving said shafts, an electric circuit for said motor, means for connecting said motor in said circuit to drive said shafts in one direction, whereby said buffer mules are caused to be first moved laterally towards said platform and into the path of the wagon, while said guide member co-operating means are co-operating with said curved parts, and then moved longitudinally of said platform and into engagement with the wagon ends, when said guide member co-operating means co-operate with said straight parts, an electrically operable brake operatively associated with said motor, automatic means for disconnecting said motor from said circuit and applying said brake to prevent the wagon from moving said buffer mules when said buffer mules have attained a predetermined position of engagement with the wagon ends, means for rendering said brake ineffective and re-connecting said motor in said circuit to drive said shafts in the reverse direction, whereby said buffer mules are caused to be disengaged from the wagon ends and moved first longitudinally of and then laterally away from said platform and clear of the path of the wagon.

17. Wagon tilting apparatus comprising in combination a platform for receiving the wagon, a fixed support for said platform, a universal joint connecting said fixed support with said platform at a point situated along one side of said platform, two suspension cables each attached to said platform at one of two spaced points situated along the opposite side thereof, a winch for each of said suspension cables, driving means for independently operating said winches to move said suspension cables in the same direction for lateral tilt of said platform and in opposite directions for longitudinal tilt of said platform, a guide member at each end of said platform connected thereto and extending along one side thereof, each of said guide members having a straight part extending longitudinally of said platform and an integral curved part adjacent the associated end of said platform and extending laterally away from said platform, a screw-threaded shaft rotatably mounted in each of said guide members, a traversing nut on each of said shafts, a first set of wheels associated with each of said traversing nuts and slidably co-operating with said guide members to prevent rotation of said traversing nuts with said shafts, a buffer mule connected to each of said traversing nuts for pivotal movement relative thereto in a substantially horizontal plane, said buffer mules being engageable with the ends of the wagon to prevent longitudinal displacement of the wagon relative to said platform, a second set of wheels associated with each of said buffer mules and slidably co-operating with said guide members, an electric motor for driving said shafts, an electric circuit for said motor, means for connecting said motor in said circuit to drive said shafts in one direction, whereby said buffer mules are caused to be first moved laterally towards said platform and into the path of the wagon, while said second sets of wheels are co-operating with said curved parts, and then moved longitudinally of said platform and into engagement with the wagon ends, when said second sets of wheels cooperate with said straight parts, an electrically operable brake operatively associated with said motor, automatic means for disconnecting said motor from said circuit and applying said brake to prevent the wagon from moving said buffer mules when said buffer mules have attained a predetermined position of engagement with the wagon ends, means for rendering said brake ineffective and re-connecting said motor in said circuit to drive said shafts in the reverse direction, whereby said buffer mules are caused to be disengaged from the wagon ends and moved first longitudinally of and then laterally away from said platform and clear of the path of the wagon.

18. Wagon tilting apparatus comprising in combination a platform for receiving the wagon, fixed supporting means for said platform, a joint connecting said fixed supporting means with said platform at one point of said platform and permitting movement thereof in at least two planes, movable supporting means for said platform coacting therewith at two further points thereof spaced from each other and from said first point, means for operating said movable supporting means to tilt said platform laterally and longitudinally about said joint, means co-operable with the wagon for preventing lateral displacement thereof relative to said platform, buffer mules associated with both ends of said platform, a spring-loaded plunger slidably projecting from each of said buffer mules and cooperable with one end of the wagon, an electric motor for each of said buffer mules, an electric circuit for each of said motors, switching means in said circuits for supplying electric power to said motors so as to cause movement of said buffer mules in one direction into engagement with the ends of the wagon to restrain the wagon from longitudinal displacement relative to said platform, thereby stressing the springs of said plungers, a brake operatively associated with each of said motors, solenoids in said circuits adapted, when deenergised, to apply said brakes, an automatic cut-out operatively associated with each of said plungers for discontinuing electric power supply to said motors and de-energising said solenoids when the springs of said plungers are stressed to a predetermined extent, whereby said brakes are applied to prevent the wagon from moving said buffer mules, switching means in said circuits for reenergising said solenoids to render said brakes ineffective and for resuming electric power supply to said motors so as to cause movement of said buffer mules in the reverse direction out of engagement with the wagon ends, and means for directing said movements of said buffer mules respectively into and clear of the path of the wagon.

19. Wagon tilting apparatus comprising in combination a platform for receiving the wagon, a fixed support for said platform, a universal joint connecting said fixed support with said platform at a point situated along one side of said platform, two suspension cables each attached to said platform at one of two spaced points situated along the opposite side thereof, a winch for each of said suspension cables, driving means for independently operating said winches to move said suspension cables in the same direction for lateral tilt of said platform and in opposite directions for longitudinal tilt of said platform, buffer mules associated with both ends of said platform, a spring-loaded plunger slidably projecting from each of said buffer mules and co-operable with one end of the wagon, an electric motor for each of said buffer mules, an electric circuit for each of said motors, switching means in said circuits for supplying electric power to said motors so as to cause movement of said buffer mules in one direction into engagement with the ends of the wagon to restrain the wagon from longitudinal displacement relative to said platform, thereby stressing the springs of said plungers, a brake operatively associated with each of said motors, solenoids in said circuits adapted, when de-energised, to apply said brakes, an automatic cut-out operatively associated with each of said plungers for discontinuing electric power supply to said motor and de-energising said solenoids when the springs of said plungers are stressed to a predetermined extent, whereby said brakes are applied to prevent the wagon from moving said buffer mules, switching means in said circuits for re-energising said solenoids to render said brakes ineffective and for resuming electric power supply to said motors so as to cause movement of said buffer mules in the reverse direction out of engagement with the wagon ends, and means for directing said movements of said buffer mules respectively into and clear of the path of the wagon.

20. Wagon tilting apparatus comprising in combination a cradle, a table pivotally suspended from said cradle for receiving the wagon, a fixed support for said cradle, a universal joint connecting said fixed support with said cradle at a point situated along one side of said cradle, two suspension cables attached to said cradle and operable to tilt said cradle laterally and longitudinally about said universal joint, a winch associated with each of said suspension cables for operating same, said suspension cables being wound on said winches in mutually opposite senses and being attached to said cradle at spaced points situated along the opposite side of said cradle and, in the untilted position of said cradle, in a horizontal plane below that of said universal joint, driving means for first rotating said two winches simultaneously in mutually opposite directions to tilt said cradle laterally and bring said spaced points level with said universal joint, and for subsequently rotating said two winches in equal directions to tilt said cradle longitudinally, means co-operable with the wagon upon gravitational pivotal movement of said table relative to said cradle during tilting thereof to prevent lateral displacement of the wagon relative to said table, a guide member at each end of said cradle connected thereto and extending along one side thereof, each of said guide members having a straight part extending longitudinally of said cradle and an integral curved part adjacent the associated end of said cradle and extending laterally away from said cradle, a screw-threaded shaft rotatably mounted in each of said guide members, a traversing nut mounted on each of said shafts and co-operating with said guide members so as to be longitudinally movable on said shafts but non-rotatable therewith, a buffer mule connected to each of said traversing nuts for pivotal movement relative thereto in a substantially horizontal plane, said buffer mules being engageable with the ends of the wagon to prevent longitudinal displacement of the wagon relative to said cradle, a spring-loaded plunger slidably projecting from each of said buffer mules and co-operable with one end of the wagon, guide member co-operating means associated with each of said buffer mules, an electric motor for each of said shafts, an electric circuit for each of said motors, switching means in said circuits for supplying electric power to said motors to drive said shafts in one direction, whereby said buffer mules are caused to be first moved laterally towards said cradle and into the path of the wagon, while said guide member co-operating means are co-operating with said curved parts, and then moved longitudinally of said cradle and into engagement with the wagon ends, when said guide member co-operating means co-operate with said straight parts, thereby stressing the springs of said plungers, a brake operatively associated with each of said motors, solenoids in said circuits adapted, when de-energised, to apply said brakes, an automatic cut-out operatively associated with each of said plungers for discontinuing electric power supply to said motors and deenergising said solenoids when the springs of said plungers are stressed to a predetermined extent, whereby said brakes are applied to prevent the wagon from moving said buffer mules, and switching means in said circuits for re-energising said solenoids to render said brakes ineffective and for resuming electric power supply to said motors, to drive said shafts in the reverse direction, whereby said buffer mules are caused to be disengaged from the wagon ends and moved first longitudinally of and then laterally away from said cradle and clear of the path of the wagon.

GEORGE WILFRED GROSSMITH.

REFERENCES CITED

The following references are of record in the file of this patent:

UNITED STATES PATENTS

| Number | Name | Date |
|---|---|---|
| 350,704 | Stretch | Oct. 12, 1886 |
| 1,593,303 | Hill | July 20, 1926 |
| 1,636,136 | Kernes | July 19, 1927 |
| 2,351,727 | Wehr | June 20, 1944 |

FOREIGN PATENTS

| Number | Country | Date |
|---|---|---|
| 164,106 | Great Britain | May 30, 1921 |
| 314,199 | Germany | Sept. 6, 1919 |

Certificate of Correction

Patent No. 2,472,703.  June 7, 1949.

GEORGE WILFRED GROSSMITH

It is hereby certified that errors appear in the printed specification of the above numbered patent requiring correction as follows:

Column 1, line 12, for the word "grin" read *grain*; column 2, line 35, after "table B" insert *connected*; column 3, line 2, for "pair" read *pairs*; column 5, line 5, for "position" read *positions*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*